3,793,338
IMIDAZOLINE DERIVATIVES OF BENZONOR-
BORNANE AND TETRAHYDRONAPHTHAL-
ENE COMPOUNDS
Francesco Lauria, Milan, Vittorio Vecchietti, Pavia, and
Raffaele Tommasini and Roberto Ceserani, Milan, Italy,
assignors to Carlo Erba S.p.A., Milan, Italy
No Drawing. Filed Nov. 26, 1971, Ser. No. 202,638
Claims priority, application Italy, Nov. 30, 1970,
32,393/70
Int. Cl. C07d 49/34
U.S. Cl. 260—309.6
21 Claims

ABSTRACT OF THE DISCLOSURE

Compounds of the formula

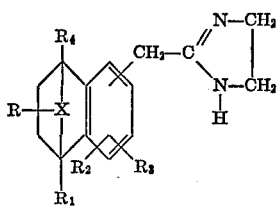

are disclosed, wherein X is saturated or unsaturated lower alkylene and R, $R_1$, $R_2$, $R_3$ and $R_4$ are independently selected from the group consisting of hydrogen, lower alkyl, lower alkenyl, lower alkoxy and hydroxy.

These compounds are therapeutically useful, having vasoconstrictor activity.

SUMMARY OF THE INVENTION

Compounds of the formula

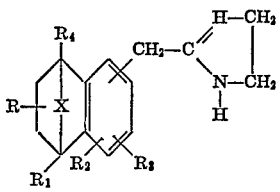

wherein X is saturated or unsaturated lower alkylene and R, $R_1$, $R_2$, $R_3$ and $R_4$ are independently selected from the group consisting of hydrogen, lower alkyl, lower alkenyl, lower alkoxy and hydroxy, and pharmaceutically acceptable salts thereof are prepared by treating the corresponding cyanomethyl or carboxymethyl derivatives with ethylenediamine. These compounds, and their therapeutically acceptable salts, exhibit vasoconstrictor activity.

DESCRIPTION OF THE INVENTION

This invention relates to new imidazoline derivatives which exhibit vasoconstrictor activity. These imidazoline derivatives are of the formula (Formula I)

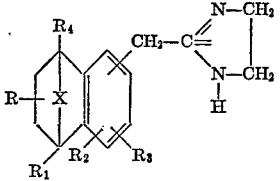

wherein X is saturated or unsaturated lower alkylene of 1-5 carbon atoms, which may be branched, such as, for instance, methylene, ethylene, methyl-methylene, isopropylidene-methylene, isopropyl-methylene and the like, and R, $R_1$, $R_2$, $R_3$ and $R_4$ are independently selected from the group consisting of hydrogen; straight or branched chain lower alkyl of 1-5 carbon atoms, such as methyl, isopropyl, n-butyl and the like; straight or branched chain lower alkenyl of 1-5 carbon atoms such as vinyl, allyl, and the like; straight or branched chain lower alkoxy of 1-5 carbon atoms such as methoxy, ethoxy, isobutoxy and the like; hydroxy; and pharmaceutically acceptable salts thereof. Preferably, the compounds of Formula I are selected from the group consisting of:

6-(2-imidazolinyl methyl)1,4-methano-1,2,3,4-
tetrahydronaphthalene,
6-(2-imidazolinyl methyl)-7-methyl-1,4-methano-1,2,3,4-
tetrahydronaphthalene,
6-(2-imidazolinyl methyl)-9-methyl-1,4-methano-1,2,3,4-
tetrahydronaphthalene,
6-(2-imidazolinyl methyl)-1-methyl-4-isopropyl-1,4-
methano-1,2,3,4-tetrahydronaphthalene,
6-(2-imidazolinyl methyl)-5-methoxy-1,4-methano-
1,2,3,4-tetrahydronaphthalene,
6-(2-imidazolinyl methyl)-5-hydroxy-1,4-methano-
1,2,3,4-tetrahydronaphthalene,
8-(2-imidazolinyl methyl)-5-hydroxy-1,4-methano-
1,2,3,4-tetrahydronaphthalene,
6-(2-imidazolinyl methyl)-9-isopropylidene-1,4-
methano-1,2,3,4-tetrahydronaphthalene,
6-(2-imidazolinyl methyl)-9-isopropyl-1,4-methano-
1,2,3,4-tetrahydronaphthalene,
6-(2-imidazolinyl methyl)-1,4-ethano-1,2,3,4-
tetrahydronaphthalene,
6-(2-imidazolinyl methyl)-5-methoxy-1,4-ethano-1,2,3,4-
tetrahydronaphthalene,
6-(2-imidazolinyl methyl)-8-methoxy-1,4-ethano-1,2,3,4-
tetrahydronaphthalene,
6-(2-imidazolinyl methyl)-5-hydroxy-1,4-ethano-1,2,3,4-
tetrahydronaphthalene,
8-(2-imidazolinyl methyl)-5-hydroxy-1,4-ethano-1,2,3,4-
tetrahydronaphthalene,
6-(2-imidazolinyl methyl)-7-methyl-1,4-ethano-1,2,3,4-
tetrahydronaphthalene,
5-(2-imidazolinyl methyl)-6,7-dimethyl-1,4-ethano-
1,2,3,4-tetrahydronaphthalene,
6-(2-imidazolinyl methyl)-1-isopropyl-4-methyl-1,4-
ethano-1,2,3,4-tetrahydronaphthalene,
6-(2-imidazolinyl methyl)-9-isopropyl-1,4-ethano-1,2,3,4-
tetrahydronaphthalene, Compounds of Formula I may be obtained by two alternative methods. The first method involves treating a compound of the formula:

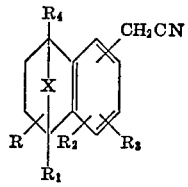

(Formula II)

wherein X, R, $R_1$, $R_2$, $R_3$ and $R_4$ have the same meaning as above, with ethylenediamine at a temperature of 50 to 200° C. The reaction proceeds readily in the absence of a solvent, although a solvent may be used if desired. Atmospheric pressure is preferred but higher and lower pressures may be used if desired. The ethylenediamine may be in base form or may be in the form of a salt, such as ethylenediamine mono-p-toluene sulphonate. After the reaction has proceeded to substantial completeness, it is generally best to neutralize the reaction mixture with an alkali, for instance, dilute soda. The imidazoline derivative may be readily recovered, for example, by solvent extraction followed by evaporation of the solvent. Suitable solvents for such extraction are esters, such as ethylacetate, butylacetate, and chlorinated hydrocarbons, such as dichloromethane, chloroform.

Compounds of Formula II are known to the art, and the preparation for making same is described in Vogel, Practical Organic Chemistry, III Ed., 1964, page 761, the disclosure of which is hereby incorporated by reference. For instance, compounds of Formula II may be prepared by chloromethylating compounds of the formula

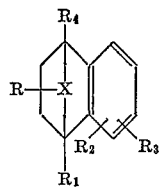

(Formula III)

as prepared following the methods of L. Friedman and F. M. Logullo, J. Org. Chem. 34, 10 (1969), page 3089 and of H. E. Simmons, J.A.C.S., 83, 1657 (1961), the disclosures of which are hereby incorporated by reference, with trioxymethylene and hydrochloric acid at a temperature of 0° to 100° in an acetic medium (pH of less than 5). The chloromethyl derivative may be reacted with a cyanide compound, such as HCN or KCN or other alkali metal cyanide, at a temperature of 25 to 150° C., preferably in the presence of a halide, such as an iodide of the alkali metal. This reaction, like that above, is preferably at atmospheric pressure, although higher or lower pressures may be used if desired.

Another method of preparing the cyano methyl compound of Formula II is to react a Mannich base of the formula

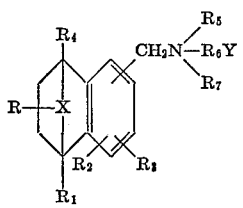

(Formula IV)

wherein $R_5$, $R_6$ and $R_7$ are lower alkyl and Y is halogen, with a cyanide, preferably hydrogen cyanide or an alkali metal cyanide such as KCN or NaCN at a temperature of 25 to 100° C., with the tertiary amino group being substituted by the cyanide group.

The second method of obtaining the imidazoline derivatives of Formula I is to react the corresponding carboxy methyl derivative, having the formula

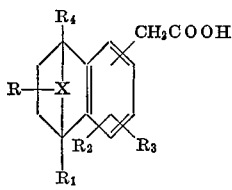

(Formula V)

with ethylene diamine in the presence of concentrated hydrochloric acid at a temperature of 25 to 150° C. The ethylene diamine may be in the base form or in the form of the above mentioned salts, such as mono-p-toluene sulphonate. The reaction is preferably at atmospheric pressure although higher or lower pressures may be used if desired.

The imidazoline derivatives of the present invention may be conveniently used in the form of therapeutically acceptable salts thereof. The imidazoline derivatives are useful both in the free base form and in the acid addition salt form, and both forms are within the scope of the present invention. The acid addition salts are generally in more convenient form to use, and for that reason are preferred.

The acids which can be used to prepare acid addition salts are preferably those which product, when combined with the free base, pharmaceutically-acceptable salts, that is, salts whose anions are relatively innocuous to the animal organism in therapeutic doses of the salts, so that the beneficial properties inherent in the free base are not vitiated by side effects ascribable to the anions; in other words, the latter do not substantially affect the therapeutic properties inherent in the cations. Appropriate pharmaceutically-acceptable salts within the scope of the invention are those derived from mineral acids such as hydrochloric acid, hydrobromic acid, hydriodic acid, nitric acid, phosphoric acid, sulfamic acid, and sulfuric acid; and organic acids such as acetic acid, citric acid, tartaric acid, lactic acid, ascorbic acid, methane-sulfonic acid, ethanesulfonic acid, quinic acid, 3-hydroxy-2-naphthoic acid, naponic acid (1,5-naphthalenedisulfonic acid), acetylsalicylic acid, salicylic acid, mucic aid, muconic acid, and the like, giving the hydrochloride, hydrobromide, hydriodide, nitrate, phosphate, sulfamate, sulfate, acetate, citrate, tartrate, lactate, ascorbate, methanesulfonate, ethanesulfonate, quinate, 3-hydroxy-2-naphthoate, naponate, acetylsalicylate, salicylate, mucate, and muconate salts respectively.

UTILITY OF THE INVENTION

The imidazoline derivatives of Formula I exhibit a vasopressor effect, which has been tested on a rat tail artery preparation, following the method described by Nicholas (J. Pharm. Pharmac., 21, 826, 1969).

For example, 6-(2 - imidazolinyl - methyl)-1,4-ethano-1,2,3,4 - tetrahydronaphthalene, and 6-(2 - imidazolinyl-methyl)-7-methyl-1,4-ethano-1,2,3,4 - tetrahydronaphthalene were tested for vasoconstrictor activity in comparison with Noradrenalin and Naphazoline and were significantly more active than these latter compounds. The final concentrations of the compounds in question, in grams per milliliter to obtain the same vasopressor effect (20 mm. Hg increase in perfusion pressure), was as set forth in Table I below:

TABLE I

| Compound: | Concentration |
|---|---|
| Nor-adrenalin | $2.10^{-7}$ |
| Naphazoline | $2,5.10^{-8}$ |
| 6 - (2 - imidazolinyl - methyl)-1,4-ethano-1,2,3,4-tetrahydronaphthalene | $2.10^{-8}$ |
| 6-(2 - imidazolinyl - methyl)-7-methyl-1,4-ethano-1,2,3,4-tetrahydronaphthalene | $2.10^{-9}$ |

EXAMPLES OF THE INVENTION

The invention will be understood more readily by reference to the following examples; however, these examples are intended to illustrate the invention and are not to be construed to limit the scope of the invention.

Example 1

10.8 g. of 1,4-methano-1,2,3,4-tetrahydronaphthalene were agitated vigorously in a flask at 62–65° C. with a mixture of 9.6 ml. of glacial acetic acid, 11.4 g. of phosphoric acid, 15 ml. of 37% HCl, and 4.2 g. of trioxymethylene. After 26 hours of agitation, the reaction mixture is cooled to 0° C., diluted to a volume of 250 ml. with cold water, and extracted with ether. The ether extract was evaporated, leaving an oil which was 6-chloromethyl 1,4-methano-1,2,3,4-tetrahydronaphthalene, which distilled at $K_{P_{0.2}}=85$–88° C.

14.3 g. of the above chloromethyl derivative are refluxed with 5.8 g. of KCN in 250 ml. anhydrous acetone. After 24 hours the reaction mixture was filtered and then concentrated to dryness. The dried residue was extracted with ether and the ethereal solution was washed with water. After washing, the ethereal solution was evaporated to dryness, yielding an oil which was 6-cyanomethyl - 1,4 - methano - 1,2,3,4 - tetrahydronaphthalene $K_{P_{0.2}}=108$–110° C.

9 g. of the above cyanomethyl derivative were mixed with 11.4 g. of ethylene diamine mono-p-toluene sulphonate, and the mixture was heated at a temperature of 175° C. for 4 hours. The mixture was then cooled and neutralized with dilute soda. The neutralized mixture was then extracted with ethylacetate. The ethylacetate extract was evaporated to dryness, yielding 6-(2-imidazolinyl methyl)-1,4-methano-1,2,3,4-tetrahydronaphthalene. This product was dissolved in alcohol containing an excess of HCl and allowed to stand at room temperature for 3 hours, after which time the substituted 1,4-methano-1,2, 3,4-tetrahydronaphthalene was precipitated with ether. The product, after crystallization from isopropanol-ethyl ether, was the hydrochloride salt of 6-(2-imidazolinyl methyl)-1,4-methano-1,2,3,4-tetrahydronaphthalene point of 190–193° C.

Example 2

Example 1 was repeated, except 7-methyl-1,4-methano-1,2,3,4-tetrahydronaphthalene was used as a starting material in place of the 1,4-methano-1,2,3,4-tetrahydronaphthalene. 7-methyl-6-cyano methyl-1,4-methano-1,2,3, 4-tetrahydronaphthalene, melting point of 67–70° C., was obtained as an intermediate product. The final product was 6-(2-imidazolinyl methyl)-7-methyl-1,4-methano-1,2, 3,4-tetrahydronaphthalene, melting point 256–257° C.

Example 3

Example 1 was repeated, except 5(8)-hydroxy-1,4-methano-1,2,3,4-tetrahydronaphthalene was used as a starting material in place of the 1,4-methano-1,2,3,4-tetrahydronaphthalene. 5-hydroxy-6-cyanomethyl-1,4-methano - 1,2,3,4 - tetrahydronaphthalene and 5-hydroxy-8-cyanomethyl-1,4-methano - 1,2,3,4 - tetrahydronaphthalene were obtained as intermediate products. The final products were 6-(2-imidazolinyl methyl)-5-hydroxy-1,4-methano-1,2,3,4-tetrahydronaphthalene and 8-(2-imidazolinyl methyl)-5-hydroxy - 1,4 - methano - 1,2,3,4 - tetrahydronaphthalene.

Example 4

Example 1 was repeated, except 9-methyl-1,4-methano-1,2,3,4-tetrahydronaphthalene was used as a starting compound in place of the 1,4-methano-1,2,3,4-tetrahydronaphthalene. 9-methyl-6-cyano methyl-1,4-methano-1,2,3, 4-tetrahydronaphthalene was obtained as an intermediate product. The final product was 6-(2-imidazolinyl methyl)-9-methyl-1,4-methano-1,2,3,4-tetrahydronaphthalene.

Example 5

Example 1 was repeated, except 9-isopropylidene-1,4-methano-1,2,3,4-tetrahydronaphthalene was used as a starting compound, in place of the 1,4-methano-1,2,3,4-tetrahydronaphthalene. 9-isopropylidene-6-cyano methyl-1,4-methano-1,2,3,4-tetrahydrnaphthalene was obtained as an intermediate product. The final product was 6-(2-imidazolinyl methyl)-9-isopropylidene-1,4-methano-1,2,3, 4-tetrahydronaphthalene.

Example 6

Example 1 was repeated, except 9-isopropyl-1,4-methano-1,2,3,4-tetrahydronaphthalene was used as a starting compound, in place of the 1,4-methano-1,2,3,4-tetrahydronaphthalene. 9-isopropyl-6-cyano methyl-1,4-methano-1,2,3,4-tetrahydrnaphthalene was obtained as an intermediate product. The final product was 6-(2-imidazolinyl methyl)-9-isopropyl - 1,4 - methano - 1,2,3,4 - tetrahydronaphthalene hydrochloride, M.P. 205–209°.

Example 7

Example 1 was repeated, except 1-methyl-4-isopropyl-1,4-methano-1,2,3,4-tetrahydronaphthalene was used as a starting compound, in place of the 1,4-methano-1,2,3,4-tetrahydronaphthalene. 1-methyl - 4 - isopropyl-6-cyano methyl-1,4-methano - 1,2,3,4 - tetrahydronaphthalene was obtained as an intermediate product. The final product was 6-(2-imidazolinyl methyl)-1-methyl-4-isopropyl-1,4-methano-1,2,3,4-tetrahydronaphthalene.

Example 8

13 g. of 1,4-ethano-1,2,3,4-tetrahydronaphthalene were vigorously agitated at 65° C. for 36 hours with a mixture of 10.65 ml. of glacial acetic acid, 12.5 g. of phosphoric acid, 16 ml. of concentrated hydrochloric acid and 4.6 g. of trioxymethylene. Thereafter, the reaction mixture was cooled to 0° C., diluted with water to a volume of 500 ml., extracted with ethyl ether, and the ethyl ether extract was concentrated to dryness to yield 6-chloromethyl - 1,4 - ethano - 1,2,3,4 - tetrahydronaphthalene ($K_{P_{0.05}}$=95° C.).

19.2 g. of the above chloromethyl derivative were refluxed for 18 hours with 5.4 g. of NaCN in 250 ml. of ethanol and 36 ml. of water.

Thereafter, the reaction mixture was concentrated to dryness, and mixed with a 1:1 mixture of water:ether. The water and ether phases were separated by decantation, and the ether extract was evaporated to dryness to produce 6-cyano methyl-1,4-ethano-1,2,3,4 - tetrahydronaphthalene which, after crystallization from hexane, had a melting point of 65–70° C.

31.4 g. of the above cyano methyl derivative were mixed with 37 g. of ethylene diamine mono p-toluene sulphonate and the resulting mixture was heated at 165° C. for 4 hours. The reaction mixture was then cooled to 0° C. and neutralized with dilute soda. The reaction mixture was then extracted with ethyl acetate, and the ethyl acetate extract was then evaporated to dryness to yield 6-(2-imidazolinyl methyl)-1,4-ethano-1,2,3,4 - tetrahydronaphthalene. This product was dissolved in alcohol containing an excess of HCl and then precipitated with ether. After crystallization from isopropanol-hexane, the product, the hydrochloride salt of the above imidazoline derivative, had a melting point of 250° C.

Example 9

Example 8 was partially repeated, using 7-methyl-1,4-ethano-1,2,3,4-tetrahydronaphthalene as a starting material in place of 1,4-ethano-1,2,3,4-tetrahydronaphthalene. 6-cyanomethyl-7-methyl-1,4 - ethano-1,2,3,4 - tetrahydronaphthalene, having a melting point of 89–91° C. was obtained as an intermediate product.

37 g. of the cyanomethyl derivative intermediate product and 40.7 g. of ethylenediamine mono p-toluene sulphonate were heated at 180–185° C. for 5 hours. The reaction mixture was then cooled to room temperature and agitated vigorously with 1000 ml. of 5% NaOH. The solid which formed was filtered, washed with water, and dried. The dried product was then crystallized from isopropyl ether to produce 39.5 g. of 6-(2-imidazolinylmethyl)-7-methyl-1,4-ethano-1,2,3,4 - tetrahydronaphthalene, having a melting point of 154–156° C. The corresponding hydrochloride was prepared using the method set forth in Example 1. The hydrochloride salt, after crystallization from methanol, had a melting point 282–283° C.

Example 10

Example 8 was repeated, using 6,7-dimethyl-1,4-ethano-1,2,3,4 - tetrahydronaphthalene as a starting product in lieu of 1,4-ethano-1,2,3,4-tetrahydronaphthalene. 5-cyanomethyl-6,7-dimethyl-1,4-ethano - 1,2,3,4 - tetrahydronaphthalene, having a melting point of 131–134° C., was obtained as an intermediate product. The final product was 5-(2-imidazolinylmethyl)-6,7-dimethyl-1,4-ethano - 1,2,3, 4-tetrahydronaphthalene hydrochloride, M.P. 233–235°.

Example 11

Example 8 was repeated, using 5-methoxy-1,4-ethano-1,2,3,4-tetrahydronaphthalene as a starting product in lieu of 1,4 - ethano - 1,2,3,4 - tetrahydronaphthalene. 5-methoxy-6-cyanomethyl-1,4-ethano - 1,2,3,4 - tetrahydronaphthalene, having a melting point of 135–140° C., and 5-methoxy-8-cyanomethyl-1,4-ethano-1,2,3,4 - tetrahydronaphthalene, having a melting point of 95–97° C. were obtained as intermediate products. The final products were 6-(2-imidazolinylmethyl)-5-methoxy - 1,4 - ethano-1,2,3,4-tetrahydronaphthalene and 8 - (2 - imidazolinyl-methyl)-5-methoxy-1,4-ethano - 1,2,3,4 - tetrahydronaphthalene.

Example 12

Example 8 was repeated, using 5-hydroxy-1,4-ethano-1,2,3,4-tetrahydronaphthalene as a starting material in lieu of the 1,4-ethano-1,2,3,4-tetrahydronaphthalene, and 5-hydroxy-6-cyanomethyl-1,4-ethano - 1,2,3,4 - tetrahydronaphthalene and 5-hydroxy-8-cyanomethyl - 1,4 - ethano-1,2,3,4-tetrahydronaphthalene were obtained as intermediate products. The final products were 6-(2-imidazolinyl-methyl)-5-hydroxy-1,4-ethano - 1,2,3,4 - tetrahydronaphthalene and 8-(2-imidazolinylmethyl) - 5 - hydroxy - 1,4-ethano-1,2,3,4-tetrahydronaphthalene.

Example 13

Example 8 was repeated, using 9-isopropyl-1,4-ethano-1,2,3,4-tetrahydronaphthalene as a starting compound in lieu of 1,4-ethano-1,2,3,4-tetrahydronaphthalene. 9-isopropyl-6-cyanomethyl-1,4-ethano - 1,2,3,4 - tetrahydronaphthalene was obtained as an intermediate product. The final product was 6-(2-imidazolinylmethyl)-9-isopropyl-1,4-ethano-1,2,3,4-tetrahydronaphthalene.

Example 14

Example 8 was repeated, using 1-isopropyl-4-methyl-1,4-ethano - 1,2,3,4 - tetrahydronaphthalene as a starting compound in lieu of 1,4-ethano-1,2,3,4 - tetrahydronaphthalene. The intermediate product was 1,4-isopropyl-4-methyl-6-cyanomethyl-1,4-ethano - 1,2,3,4 - tetrahydronaphthalene. The final product was 6-(2-imidazolinylmethyl)-1-isopropyl-4-methyl-1,4-ethano - 1,2,3,4 - tetrahydronaphthalene.

Example 15

4.37 g. of KCN were dissolved in 30 ml. of water, and the resulting solution was added to a solution of 20 g. of 6-dimethylaminomethyl-1,4-ethano - 1,2,3,4 - tetrahydronaphthalene methodide in 150 ml. of dioxane. After refluxing for two hours, the mixture was evaporated to dryness and the residue was extracted with ether. The ether extract was evaporated to dryness producing solid 6-cyanomethyl-1,4-ethano-1,2,3,4 - tetrahydronaphthalene having a melting point, after crystallization from hexane, of 65–70° C. Using the method of Example 8, the above cyanomethyl derivative was converted into 6-(2-imidazolinylmethyl)-1,4-ethano - 1,2,3,4 - tetrahydronaphthalene. Also the other compounds described in the preceding examples could be prepared by the same method.

Example 16

16.5 g. of ethylene diamine mono-p-toluene sulphonate were added to 15 g. of 6-carboxymethyl-1,4-ethano-1,2,3,4-tetrahydronaphthalene, in 150 ml. of ethyl alcohol containing 10 ml. of concentrated HCl. The resulting mixture was refluxed for 15 hours and then evaporated to dryness. The dried residue was dissolved in a mixture of ether and a 5% soda aqueous solution. The ether and aqueous phases were separated by decantation and the ether phase evaporated to dryness, producing 6-(2-imidazolinylmethyl)-1,4 - ethano - 1,2,3,4 - tetrahydronaphthalene. Using the technique set forth in Example 8, this product was transformed into the corresponding hydrochloride salt. Also the other compounds described in the Examples 1 to 14 could be prepared by the same method.

What is claimed is:
1. Compound of the formula

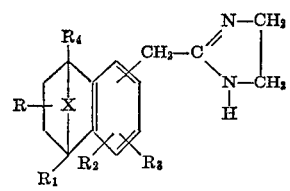

wherein X is methylene or ethylene which may be substituted by alkyl or alkylidene, wherein the total number of carbon atoms of X is at most 5, and R, $R_1$, $R_3$ and $R_4$ are independently selected from the group consisting of hydrogen, lower alkyl, lower alkenyl, lower alkoxy and hydroxy and $R_2$ is selected from the group consisting of hydrogen and lower alkyl, or a pharmaceutically acceptable salt thereof.

2. Compound as claimed in claim 1, wherein the methylene or ethylene radical is unsubstituted or substituted by a member selected from the group consisting of methyl, isopropyl and isopropylidene.

3. Compound as claimed in claim 1 wherein said compound is 6-(2-imidazolinyl methyl)1,4-methano-1,2,3,4-tetrahydronaphthalene.

4. Compound as claimed in claim 1, wherein said compound is 6-(2-imidazolinyl methyl)-7-methyl-1,4-methano-1,2,3,4-tetrahydronaphthalene.

5. Compound as claimed in claim 1 wherein said compound is 6-(2-imidazolinyl methyl)-9-methyl-1,4-methano-1,2,3,4-tetrahydronaphthalene.

6. Compound as claimed in claim 1 wherein said compound is 6-(2-imidazolinyl methyl)-1-methyl-4-isopropyl-1,4-methano-1,2,3,4-tetrahydronaphthalene.

7. Compound as claimed in claim 1 wherein said compound is 6-(2-imidazolinyl methyl)-5-methoxy-1,4-methano-1,2,3,4-tetrahydronaphthalene.

8. Compound as claimed in claim 1 wherein said compound is 6-(2-imidazolinyl methyl)-5-hydroxy-1,4-methano-1,2,3,4-tetrahydronaphthalene.

9. Compound as claimed in claim 1 wherein said compound is 8-(2-imidazolinyl methyl)-5-hydroxy-1,4-methano-1,2,3,4-tetrahydronaphthalene.

10. Compound as claimed in claim 1 wherein said compound is 6-(2-imidazolinyl methyl)-9-isopropylidene-1,4-methano-1,2,3,4-tetrahydronaphthalene.

11. Compound as claimed in claim 1 wherein said compound is 6-(2-imidazolinyl methyl)-9-isopropyl-1,4-methano-1,2,3,4-tetrahydronaphthalene.

12. Compound as claimed in claim 1 wherein said compound is 6-(2-imidazolinyl methyl)-1,4-ethano-1,2,3,4-tetrahydronaphthalene.

13. Compound as claimed in claim 1 wherein said compound is 6-(2-imidazolinyl methyl)-5-methoxy-1,4-ethano-1,2,3,4-tetrahydronaphthalene.

14. Compound as claimed in claim 1 wherein said compound is 6-(2-imidazolinyl methyl)-8-methoxy-1,4-ethano-1,2,3,4-tetrahydronaphthalene.

15. Compound as claimed in claim 1 wherein said compound is 6-(2-imidazolinyl methyl)-5-hydroxy-1,4-ethano-1,2,3,4-tetrahydronaphthalene.

16. Compound as claimed in claim 1 wherein said compound is 8-(2-imidazolinyl methyl)-5-hydroxy-1,4-ethano-1,2,3,4-tetrahydronaphthalene.

17. Compound as claimed in claim 1 wherein said compound is 6 - (2 - imidazolinyl methyl)-7-methyl-1,4-ethano-1,2,3,4-tetrahydronaphthalene.

18. Compound as claimed in claim 1 wherein said compound is 5-(2-imidazolinyl methyl)-6,7-dimethyl-1,4-ethano-1,2,3,4-tetrahydronaphthalene.

19. Compound as claimed in claim 1 wherein said compound is 6-(2-imidazolinyl methyl)-1-isopropyl-4-methyl-1,4-ethano-1,2,3,4-tetrahydronaphthalene.

20. Compound as claimed in claim 1 wherein said compound is 6-(2-imidazolinyl methyl)-9-isopropyl-1,4-ethano-1,2,3,4-tetrahydronaphthalene.

21. Compound as claimed in claim 1 wherein said compound is 8-(2-imidazolinyl-methyl)-5-methoxy-1,4-ethano-1,2,3,4-tetrahydronaphthalene.

References Cited

FOREIGN PATENTS

| | | |
|---|---|---|
| 620,339 | 3/1949 | Great Britain _____ 260—309.6 |
| 769,248 | 3/1957 | Great Britain _____ 260—309.6 |
| 967,594 | 8/1964 | Great Britain _____ 260—309.6 |

OTHER REFERENCES

Hofmann: Imidazole and its derivatives, part I, pp. 213–19, N.Y., Interscience, 1953.

Thomas et al.: J. Med. Chem., vol. 13, pp. 196–203 (March 1970).

Chemical Abstracts, vol. 75, Subject Index E–O, July-December 1971, pp. 1477S, 1485S and 2403S (1972).

NATALIE TROUSOF, Primary Examiner

U.S. Cl. X.R.

260—465 F, 465 R, 515 R, 520, 567.6 M, 651 R, 651 HA; 424—273

UNITED STATES PATENT OFFICE
CERTIFICATE OF CORRECTION

Patent No. 3,793,338          Dated  February 19, 1974

Inventor(s) Francesco Lauria, Vittorio Vecchietti, Raffaele Tommasini, and Roberto Ceserani It is certified that error appears in the above-identified patent and that said Letters Patent are hereby corrected as shown below:

In column 1, Formula I is as follows:

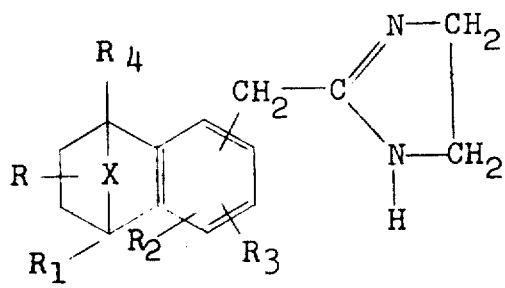

In column 5, lines 12 and 13 should read:

"methyl)-1,4-methano-1,2,3,4-tetrahydronaphthalene and has a melting point of 190-193°C."

Signed and sealed this 12th day of November 1974.

(SEAL)
Attest:

McCOY M. GIBSON JR.
Attesting Officer

C. MARSHALL DANN
Commissioner of Patents